United States Patent
Barzaghi et al.

(10) Patent No.: US 10,348,608 B2
(45) Date of Patent: Jul. 9, 2019

(54) METHOD FOR ROUTING A TRAFFIC FLOW IN A RADIO ACCESS NETWORK AND NODE FOR IMPLEMENTING SUCH A METHOD

(75) Inventors: Giorgio Barzaghi, Milan (IT); Giacomo Mirelli, Carugate (IT); Giuseppe De Blasio, Rome (IT)

(73) Assignee: Alcatel Lucent, Boulogne-Billancourt (FR)

( * ) Notice: Subject to any disclaimer, the term of this patent is extended or adjusted under 35 U.S.C. 154(b) by 1310 days.

(21) Appl. No.: 12/167,517

(22) Filed: Jul. 3, 2008

(65) Prior Publication Data

US 2009/0016269 A1 Jan. 15, 2009

(30) Foreign Application Priority Data

Jul. 6, 2007 (EP) .................................... 07290853

(51) Int. Cl.
*H04L 12/28* (2006.01)
*H04L 12/701* (2013.01)
*H04L 12/801* (2013.01)

(52) U.S. Cl.
CPC .............. *H04L 45/00* (2013.01); *H04L 47/10* (2013.01)

(58) Field of Classification Search
CPC ................................ H04L 45/00; H04L 47/10
USPC ................ 370/328–330, 335–345, 412–418, 370/392–393, 470, 471, 473
See application file for complete search history.

(56) References Cited

U.S. PATENT DOCUMENTS

| | | | |
|---|---|---|---|
| 6,304,552 B1* | 10/2001 | Chapman et al. | 370/232 |
| 6,510,135 B1* | 1/2003 | Almulhem et al. | 370/229 |
| 2002/0015391 A1* | 2/2002 | Kriaras | H04M 7/006 370/328 |
| 2002/0159445 A1* | 10/2002 | Yanagimachi | H04L 49/251 370/355 |
| 2003/0028874 A1* | 2/2003 | Huber | 725/37 |
| 2003/0063611 A1* | 4/2003 | Schaub | H04L 12/5693 370/395.32 |
| 2003/0214945 A1* | 11/2003 | Kawamura | H04L 45/02 370/389 |
| 2005/0286487 A1* | 12/2005 | Chitrapu | 370/351 |
| 2006/0209899 A1* | 9/2006 | Cucchi et al. | 370/498 |

FOREIGN PATENT DOCUMENTS

| | | |
|---|---|---|
| EP | 1643690 A1 | 4/2006 |
| WO | 2005/062636 A1 | 7/2005 |
| WO | 2007/033238 A2 | 3/2007 |

* cited by examiner

Primary Examiner — Thai D Hoang
(74) Attorney, Agent, or Firm — Chiesa Shahinian & Giantomasi PC (57) ABSTRACT

It is disclosed a method for routing an upstream traffic flow generated at a node of a radio access network. The method comprises the following steps: a) at the node, splitting the upstream traffic flow in packets; b) at the node, inserting in at least one of the packets an information indicative of the destination of the upstream traffic flow; and c) routing the at least one of the packets according to the information indicative of the destination through a packet-switch operation.

10 Claims, 5 Drawing Sheets

METHOD FOR ROUTING A TRAFFIC FLOW IN A RADIO ACCESS NETWORK AND NODE FOR IMPLEMENTING SUCH A METHOD

FIELD OF THE INVENTION

The present invention generally relates to the field of radio access networks. In particular, the present invention relates to a method for routing a traffic flow in a radio access network, to a node implementing such a method and to a radio access network including such a node.

BACKGROUND ART

It is known that a radio access network allows a plurality of users provided with respective radio terminals (e.g. mobile phones, PDAs, laptop PCs, etc.) to access a number of telephone services and/or data services (such as Internet access, text message services and multimedia message services, e-mail, etc.). Exemplary radio access networks are the GSM (Global System for Mobile communications), the UMTS (Universal Mobile Telecommunications System) and the WiMAX (Worldwide Interoperability for Microwave Access).

A radio access network typically comprises a plurality of network nodes (or simply nodes), wherein each node comprises one or more access devices. Each access device has a coverage area and it is capable of exchanging traffic via radio with radio terminals located within its coverage area. For instance, in a GSM radio access network the access devices are called BTS (Base Station Transceiver).

Typically, the nodes of a radio access network are connected to one another according to a tree logical topology, wherein each terminal node is connected to an upstream node and wherein each intermediate node is connected to at least one downstream node and to one upstream node. Each node is connected to adjacent nodes (both downstream and upstream) either by means of wireless transceivers (e.g. microwave transceivers) or by means of wired transceivers. The root of the tree logical topology corresponds to a traffic collection center. For instance, in a GSM radio access network the traffic collection center is termed BSC (Base Station Controller).

A radio access network is typically configured to transport a plurality of traffic flows across the tree logical topology. In the following description and in the claims, the expression "upstream traffic flow" or simply "upstream flow" will designate a traffic flow transported from a node to the traffic collection center. Besides, the expression "downstream traffic flow" or simply "downstream flow" will designate a traffic flow transported from the traffic collection center to a node.

In particular, the transceivers connecting each node of a radio access network to the adjacent nodes are typically configured to transmit and receive TDM (Time Division Multiplexing) traffic flows which may be either synchronous (e.g. SDH or Sonet tributaries) or plesiochronous (e.g. PDH tributaries).

By assuming that a terminal node comprises n access devices (wherein n≥1), the terminal node typically receives through each of the n access devices an upstream flow comprising traffic transmitted by radio terminals located within its coverage area. Therefore, the terminal node typically performs a TDM multiplexing of the n received upstream flows, and it transmits the n multiplexed upstream flows to the intermediate node located immediately upstream.

By assuming that the intermediate node is connected only to the terminal node, and that it further comprises m access devices (wherein m≥1), the intermediate node receives the n multiplexed upstream flows from the terminal node. Further, typically, the intermediate node receives through each of the m access devices an upstream flow comprising traffic transmitted by radio terminals located within its coverage area. Therefore, the intermediate node typically performs a TDM multiplexing of the n+m received upstream flows, and it transmits the n+m multiplexed upstream flows to the intermediate node located immediately upstream.

Each node (both the terminal node and the intermediate node) performs TDM multiplexing of the received upstream flows by means of a respective TDM matrix. In particular, the TDM matrix switches each upstream flow received through one of its inputs towards one of its outputs. The output towards which each upstream flow has to be switched is determined by means of a routing table. The routing table typically associates each input of the TDM matrix to an output of the TDM matrix. Since the radio access network has a tree logical topology, the TDM matrix typically has a single output towards which all the upstream flows are transmitted in the upstream direction. Accordingly, in the routing table all the inputs of the TDM matrix are associated to a same output.

SUMMARY OF THE INVENTION

The known solution for routing upstream traffic flows in a radio access network has some drawbacks.

Indeed, when in a radio access network a new upstream traffic flow is activated (e.g. when the radio access network is expanded by adding new nodes, as well as by adding new access devices to an existing node), the operation of upgrading the network configuration for supporting transmission of the new upstream traffic flow towards the traffic collection center is very complex and time-consuming.

Indeed, before activating the new upstream traffic flow, a predefined path must be defined which allows the new upstream traffic flow to be transported from the node originating it to the traffic collection center. Upon definition of the path, the configuration of all the nodes composing the path has to be upgraded. In particular, in each of these nodes, the TDM matrix must be upgraded by adding a new input and by providing a physical connection between such a new input and the TDM matrix output. Further, in the routing table a new field has to be added, which associates the new input to the TDM matrix output.

These operations are typically manually performed, and then they are very long and complex, especially when the path involves a high number of nodes.

Accordingly, the present invention addresses the problem of providing a method for routing an upstream traffic flow in a radio access network which overcomes the aforesaid drawback.

In particular, the present invention addresses the problem of providing a method for routing an upstream traffic flow in a radio access network which allows to upgrade the network configuration for supporting transmission of a new upstream traffic flow in an easier and quicker way than the above known solution.

According to a first aspect, the present invention provides a method for routing an upstream traffic flow generated at a node of a radio access network. The method comprises: a) at the node, splitting the upstream traffic flow in packets; b) at the node, inserting in at least one of the packets an information indicative of a destination of the upstream traffic flow; and c) routing the at least one of the packets according to the information indicative of the destination through a packet-switch operation.

Preferably, step c) comprises a step of automatically generating, according to the information indicative of the destination, an association between the packets and an output of a packet-switching matrix of the node.

Profitably, the method further comprises a step of inserting in the at least one of the packets an information indicative of a packet priority. In this case, preferably, the method further comprises a step of deciding whether to transmit or discard the at least one of the packets according to the information indicative of the packet priority.

According to advantageous embodiments, step c) further comprises, in case one of the packets comprises a portion of the upstream traffic flow which does not transport traffic, discarding the one of the packets.

According to a second aspect, the present invention provides a node of a radio access network, wherein the node comprises an input module configured to receive an upstream traffic flow, to split the upstream traffic flow in packets, and to insert in at least one of the packets an information indicative of a destination of the upstream traffic flow, and wherein the node further comprises a packet-switching matrix configured to route the at least one of the packets according to the information indicative of the destination.

Preferably, the node further comprises a switch controller configured to automatically generate, according to the information indicative of the destination, an association between the packets and an output of a packet-switching matrix of the node, and a routing table for storing the association.

Profitably, the input module is further configured to insert in the at least one of the packets an information indicative of a packet priority, and the packet-switching matrix is further configured to decide whether to transmit or discard the at least one of the packets according to the information indicative of the packet priority.

According to preferred embodiments, the input module is further configured to, in case one of the packets comprises a portion of the upstream traffic flow which does not transport traffic, discard the one of the packets.

According to a third aspect, the present invention provides a radio access network comprising a node as set forth above.

BRIEF DESCRIPTION OF THE DRAWINGS

The present invention will become clearer by reading the following detailed description, given by way of example and not of limitation, to be read with reference to the accompanying drawings wherein.

DETAILED DESCRIPTION OF PREFERRED EMBODIMENTS OF THE INVENTION

Figure 1:
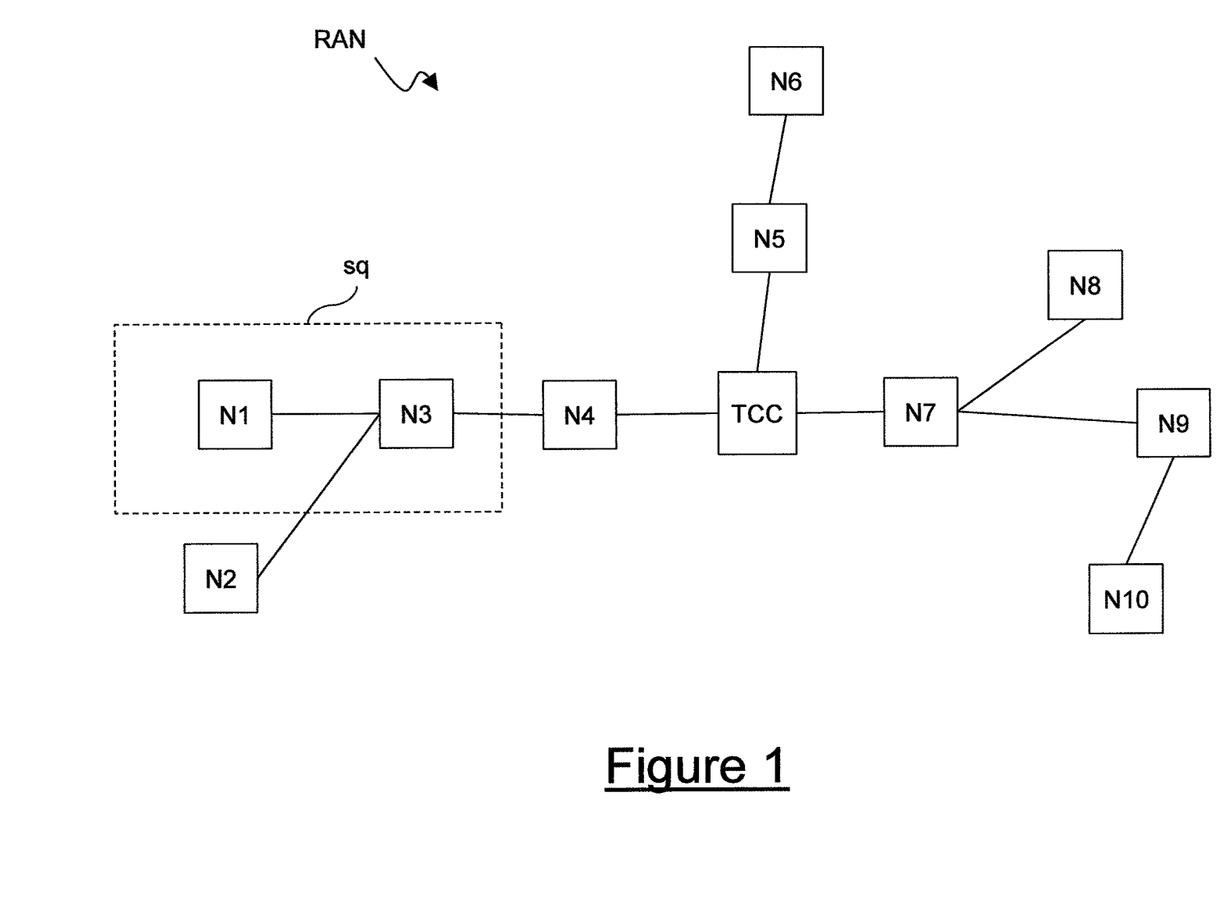
FIG. 1 schematically shows an exemplary radio access network.

FIG. 1 schematically shows an exemplary radio access network RAN. The radio access network RAN comprises ten nodes N1, N2, . . . , N10 connected each other according to a tree logical topology. Although in FIG. 1 connections between adjacent nodes are represented by lines, such connections may be either wired connections or wireless connections.

In particular, the nodes N1 and N2 are terminal nodes connected to the intermediate node N3, which is in turn connected to the intermediate node N4, which is in turn connected to a traffic collection center TCC. Further, the node N6 is a terminal node which is connected to the intermediate node N5, which is in turn connected to the traffic collection center TCC. Further, the node N10 is a terminal node which is connected to the intermediate node N9, which is in turn connected to the intermediate node N7. Finally, the terminal node N8 is connected to the intermediate node N7.

Herein after, the structure and operation of the terminal node N1 and of the intermediate node N3 (which are enclosed by a dashed line sq in FIG. 1) according to an embodiment of the present invention will be described in detail.

Figure 2:
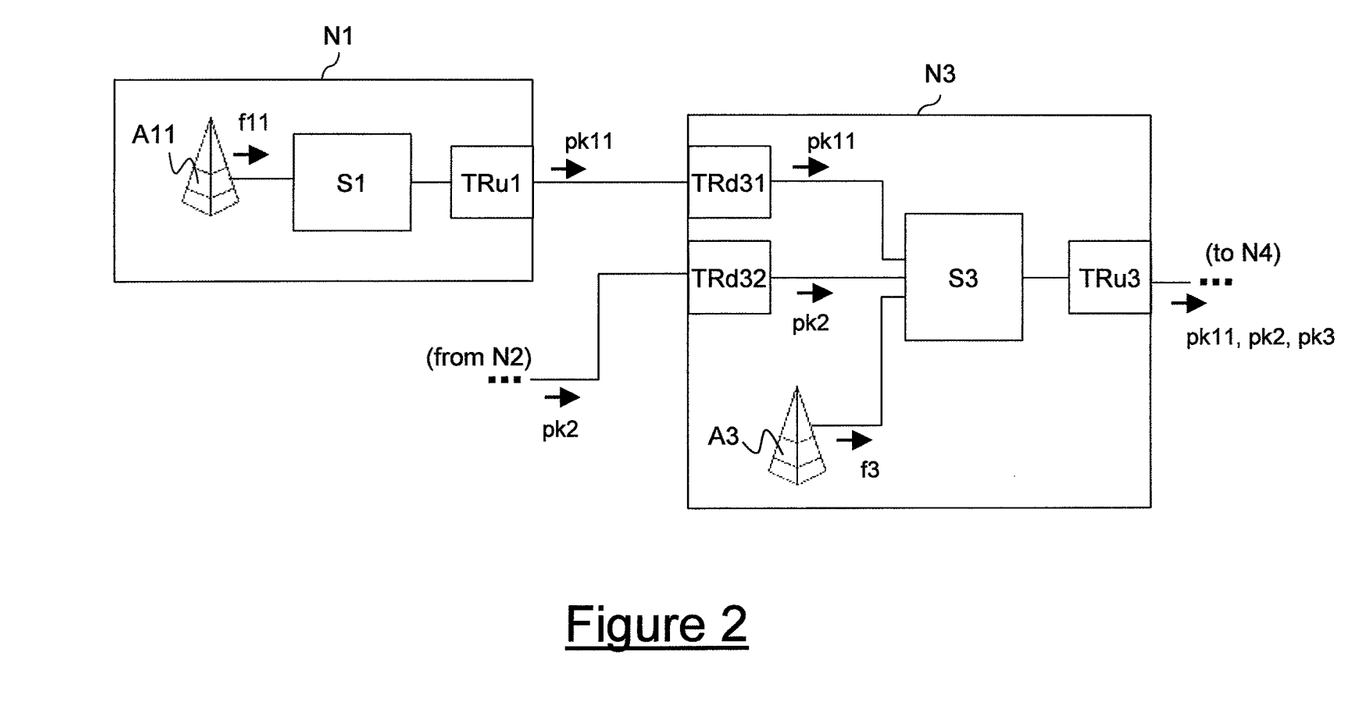
FIG. 2 shows in detail the structure of a portion of the radio access network of FIG. 1, comprising a terminal node and an intermediate node, according to an embodiment of the present invention.

By referring to FIG. 2, the terminal node N1 preferably comprises an access device A11, an upstream side transceiver TRu1 and a switch S1. The switch S1 has an input connected to the access device A11 and an output connected to the upstream side transceiver TRu1.

Further, the intermediate node N3 preferably comprises an access device A3, a first downstream side transceiver TRd31, a second downstream side transceiver TRd32, an upstream side transceiver TRu3 and a switch S3. Preferably, the first downstream side transceiver TRd31 of the intermediate node N3 is configured to exchange traffic flows with the upstream side transceiver TRu1 of the terminal node N1, thus connecting the intermediate node N3 and the terminal node N1. Further, the second downstream side transceiver TRd32 of the intermediate node N3 is configured to exchange traffic flows with an upstream side transceiver of the node N2 (not shown in FIG. 2), thus connecting the intermediate node N3 and the terminal node N2. As shown in FIG. 2, the switch S3 has three inputs and an output. The three inputs are connected to the first downstream side transceiver TRd31, to the second downstream side transceiver TRd32 and to the access device A3. The output of the switch S3 is connected to the upstream side transceiver TRu3.

The number of access devices included in the nodes N1 and N3 is only exemplary since, as already mentioned above, a node may comprise any number of access devices equal to or higher than 1. Further, the nodes N1 and N3 may comprise other devices, which are not shown in FIG. 2 since they are not relevant to the present description.

Figure 3A:
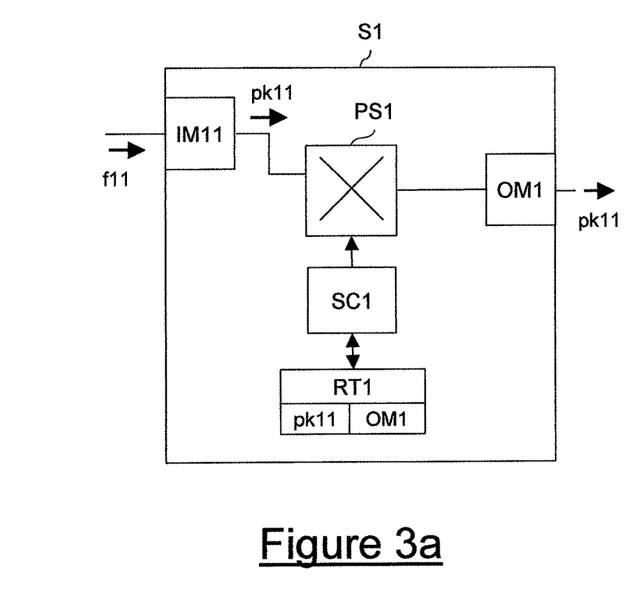
FIGS. 3a and 3b schematically show the structure of the switches comprised in the terminal node and in the intermediate node of FIG. 2, respectively.

By referring to FIG. 3a, the switch S1 of the terminal node N1 according to an embodiment of the present invention will be now described in detail.

The switch S1 comprises an input module IM11, a packet-switching matrix PS1, a switch controller SC1, a routing table RT1 and an output module OM1. The input module IM11 is preferably connected to the access device A11 (not shown in FIG. 3a). The packet-switching matrix PS1 preferably has an input connected to the input module IM11 and an output connected to the output module OM1. The packet-switching matrix PS1 may have further inputs and outputs, which are not shown in FIG. 3a since they are not relevant to the present description. Preferably, the output module OM1 is connected to the upstream side transceiver TRu1 (not shown in FIG. 3a).

Figure 3B:
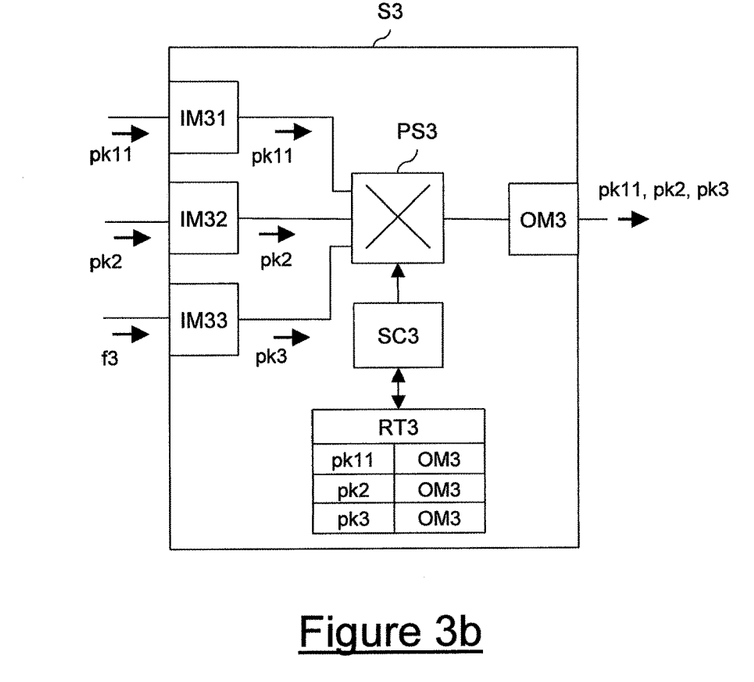

By referring to FIG. 3b, the switch S3 of the intermediate node N3 according to an embodiment of the present invention will be now described in detail.

The switch S3 comprises three input modules IM31, IM32, IM33, a packet-switching matrix PS3, a switch controller SC3, a routing table RT3 and an output module OM3. The input module IM31 is preferably connected to the first downstream side transceiver TRd31 (not shown in FIG. 3b), the input module IM32 is preferably connected to the second downstream side transceiver TRd32 (not shown in FIG. 3b), and the input module IM33 is preferably connected to the access device A3 (not shown in FIG. 3b). The packet-switching matrix PS3 preferably has inputs (three inputs in this example) connected to the input modules IM31, IM32 and IM33, respectively, and an output connected to the output module OM3. The packet-switching matrix PS3 may have further inputs and outputs, which are not shown in FIG. 3b since they are not relevant to the present description. Preferably, the output module OM3 is connected to the upstream side transceiver TRu3 (not shown in FIG. 3b).

Preferably, the packet-switching matrix PS1 and the packet-switching matrix PS3 are of a same type. For instance, both PS1 and PS3 may be Ethernet switches.

By referring to FIGS. 2, 3a and 3b, the operation of the nodes N1 and N3 according to an embodiment of the present invention will be now described in detail, in case of transmission of upstream traffic flows.

According to this embodiment, the access device A11 of the terminal node N1 is configured to transmit to the switch S1 an upstream traffic flow f11 transporting traffic transmitted by radio terminals located within its coverage area. Preferably, the upstream traffic flow f11 is a TDM flow, such as a synchronous tributary (e.g. an SDH or a Sonet tributary) or a plesiochronous tributary (e.g. a PDH tributary).

Preferably, when the switch S1 receives the upstream traffic flow f11 from the access device A11 by means of the input module IM11, the input module IM11 splits the upstream flow f11 in a sequence of packets pk11. Preferably, the packets pk11 are formatted according to a packet format that the packet-switching matrix PS1 is able to switch. For instance, if the packet-switching matrix PS1 is an Ethernet switch, the packets pk11 are preferably Ethernet packets. Besides, preferably, the input module IM11 inserts in each packet pk11 an information indicative of the packet destination. For instance, such an information may be the address of the traffic collection center TCC. Further, preferably, the input module IM11 inserts in each packet pk11 an information indicative of a packet priority. Further, preferably, the input module IM11 is further configured to discard possible empty packets pk11, i.e. packets pk11 comprising portions of the upstream traffic flow f11 which do not transport any traffic.

Preferably, the routing table RT1 of the switch S1 comprises a field including an association between the packets pk11 and the output module through which the packets pk11 have to be output by the packet-switching matrix PS1, i.e. OM1. Therefore, according to such an association, upon reception of packets pk11 the switch controller SC1 configures the packet-switching matrix PS1 so that the packets pk11 are transmitted through the output module OM1 to the upstream side transceiver TRu1, which then forwards them to the intermediate node N3. Preferably, the probability to transmit each packet pk11 through the output module OM1 depends on the value of the information indicative of the packet priority.

Then, the intermediate node N3 receives the packets pk11 through the first downstream side transceiver TRd31, which forwards them to the switch S3.

Further, by assuming that the node N2 (not shown in FIG. 2) is similar to the above described terminal node N1, the intermediate node N3 receives also packets pk2 from the terminal node N2 through the second downstream side transceiver TRd32. Also the packets pk2 are forwarded to the switch S3. Preferably, also the packets pk2 comprise an information indicative of the packet priority.

Further, the access device A3 of the intermediate node N3 is configured to transmit to the switch S3 an upstream traffic flow f3 transporting traffic transmitted by radio terminals located within its coverage area. Preferably, the upstream traffic flow f3 is a TDM flow, such as a synchronous tributary (e.g. an SDH or a Sonet tributary) or a plesiochronous tributary (e.g. a PDH tributary).

Accordingly, the switch S3 receives the packets pk11, the packets pk2 and the upstream flow f3.

In particular, the switch S3 receives the packets pk11 through its input module IM31. Since the packets pk11 already are formatted according to a packet format which can be switched by the packet-switching matrix PS3, the input module IM31 only forwards the packets pk11 to the packet-switching matrix PS3, without performing any other operation.

Besides, the switch S3 receives the packets pk2 through its input module IM32. By assuming that also the packets pk2 are formatted according to a packet format which can be switched by the packet-switching matrix PS3, also the input module IM32 only forwards the packets pk2 to the packet-switching matrix PS3, without performing any other operation.

Besides, when the switch S3 receives the upstream traffic flow f3 from the access device A3 by means of the input module IM33, the input module IM33 splits the upstream flow f3 in a sequence of packets pk3. Preferably, the packets pk3 are formatted according to the same packet format according to which pk11 and pk2 are formatted, i.e. the packet format that the packet-switching matrix PS3 is able to switch. Besides, preferably, the input module IM33 inserts in each packet pk3 an information indicative of the packet destination. For instance, such an information may be the address of the traffic collection center TCC. Further, preferably, the input module IM33 inserts in each packet pk3 an information indicative of the packet priority. Further, preferably, the input module IM33 is further configured to discard possible empty packets pk3, i.e. packets pk3 comprising portions of the upstream traffic flow f3 which do not transport any traffic.

According to embodiments of the present invention, the switch S3 then multiplexes the packets pk11, pk2 and pk3, and it transmits the multiplexed packets in the upstream direction (i.e. to the intermediate node N4, in the exemplary network RAN of FIG. 1).

In particular, the routing table RT3 of the switch S3 comprises a field including an association between the packets pk11 and the output module through which the packets pk11 have to be output by the packet-switching matrix PS3, i.e. OM3. Besides, the routing table RT3 of the switch S3 comprises a field including an association between the packets pk2 and the output module through which the packets pk2 have to be output by the packet-switching matrix PS3, i.e. OM3. Finally, the routing table RT3 of the switch S3 comprises a field including an association between the packets pk3 and the output module through which the packets pk3 have to be output by the packet-switching matrix PS3, i.e. OM3. Therefore, according to such associations, upon reception of packets pk11, pk2 and pk3 the switch controller SC3 configures the packet-switching matrix PS3 so that the packets pk11, pk2 and pk3 are transmitted through the output module OM3 to the upstream side transceiver TRu3, which then forwards them in the upstream direction. Preferably, the probability to transmit each packet pk11, pk2 and pk3 through the output module OM3 depends on the value of the respective information indicative of the packet priority.

Figure 4:
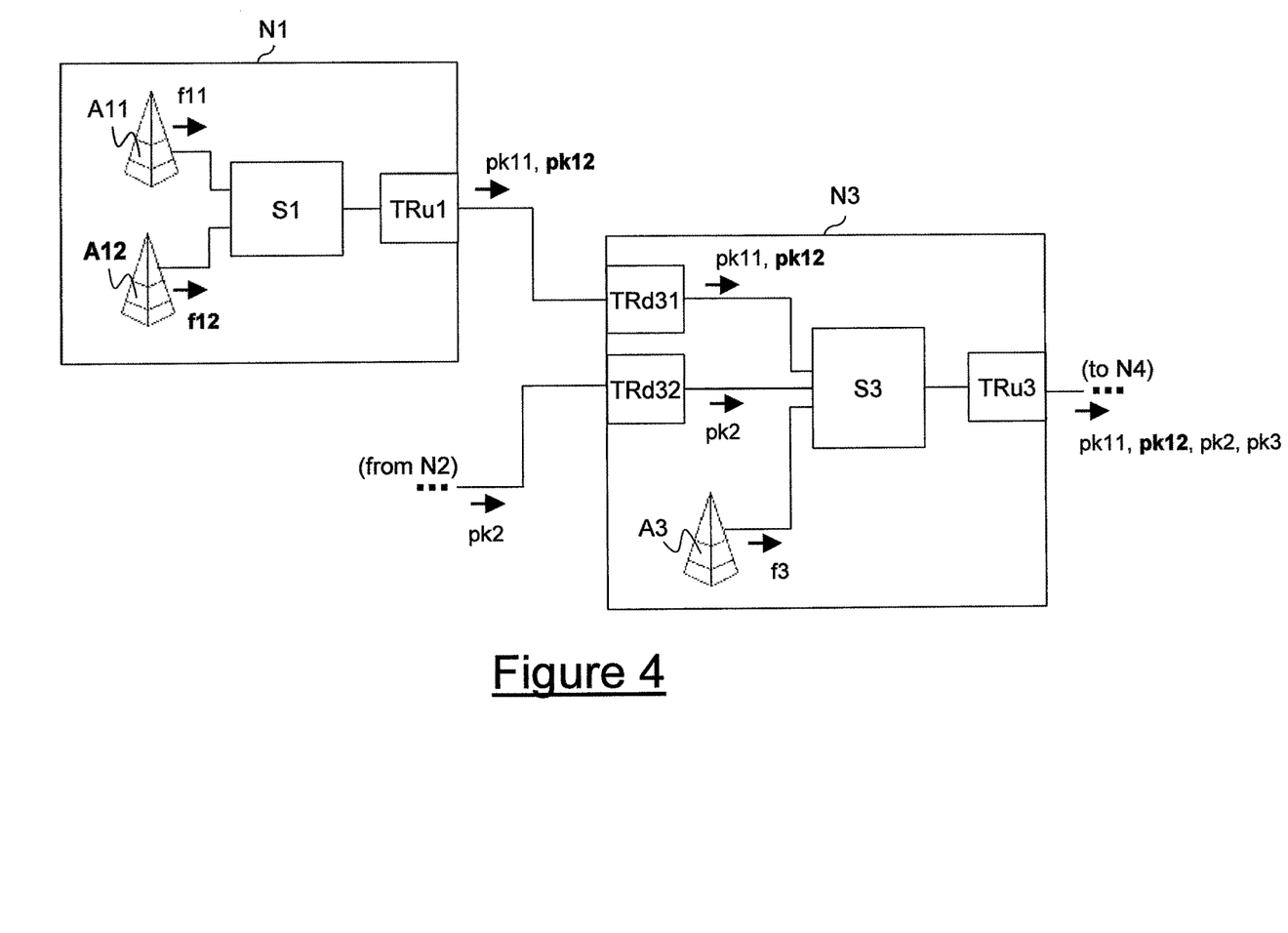
FIG. 4 shows the structure of a portion of the radio access network of FIG. 2 after activation of a new access device at the terminal node.

It is now assumed that the configuration of the terminal node N1 shown in FIG. 2 is changed. In particular, for instance, it is assumed that the radio access network RAN is expanded by activating a new access device A12 at the terminal node N1. The new configuration of the terminal node N1 is shown in FIG. 4. In the FIGS. 4, 5a and 5b bold reference numerals designate elements distinguishing the new configuration of the nodes N1 and N3 (and their switches S1 and S3) from the configuration shown in FIGS. 2, 3a and 3b.

Figure 5A:
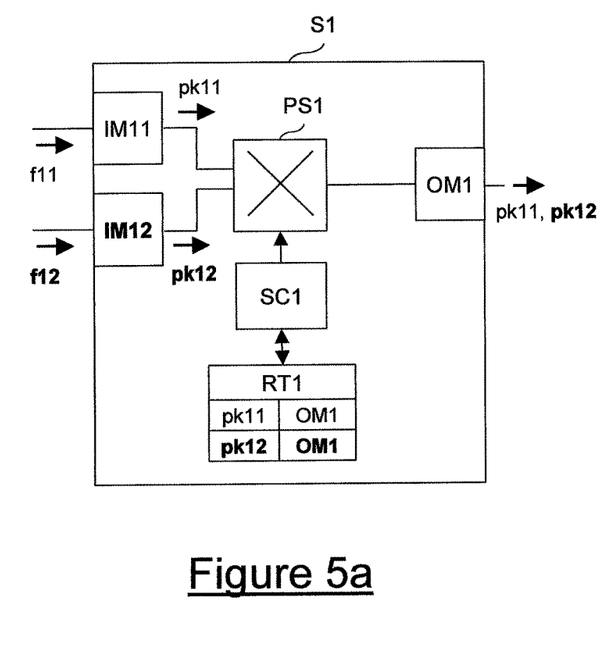
FIGS. 5a and 5b schematically show the structure of the switches comprised in the terminal node and in the intermediate node of FIG. 4, respectively.

As shown in FIG. 4, the access device A12 is connected to the switch S1 by means of a new input module IM12 (which is shown in FIG. 5a).

Similarly to the access device A11, the access device A12 is configured to transmit to the switch S1 an upstream traffic flow f12 transporting traffic transmitted by radio terminals located within its coverage area. Preferably, the upstream traffic flow f12 is a TDM flow, such as a synchronous tributary (e.g. an SDH or a Sonet tributary) or a plesiochronous tributary (e.g. a PDH tributary).

Preferably, when the switch S1 receives the upstream traffic flow f12 from the access device A12 by means of the input module IM12, the input module IM12 splits the upstream flow f12 in a sequence of packets pk12. Preferably, the packets pk12 are formatted according to the same packet format according to which the packets pk11 are formatted, i.e. the packet format that the packet-switching matrix PS1 is able to switch. Besides, preferably, the input module IM12 inserts in each packet pk12 an information indicative of the packet destination. For instance, such an information may be the address of the traffic collection center TCC. Further, preferably, the input module IM12 inserts in each packet pk12 an information indicative of the packet priority. Further, preferably, the input module IM12 is configured to discard possible empty packets pk12, i.e. packets pk12 comprising portions of the upstream traffic flow f3 which do not transport any traffic.

According to embodiments of the present invention, the switch S1 multiplexes the packets pk11 and pk12, and it transmits the multiplexed packets pk11, pk12 to the intermediate node N3.

In particular, processing of the packets pk11 is similar to the above described processing. Accordingly, a detailed description will not be repeated.

On the other hand, since the packets pk12 have the same destination of the packets pk11 (i.e. the traffic collection center TCC), the information indicative of packet destination included in the packets pk12 is identical to the information indicative of packet destination included in the packets pk11. Therefore, advantageously, the switch controller SC1 is capable of determining autonomously that the packets pk12 have to be output from the packet-switching matrix PS1 through the same output module through which the packets pk11 are output, i.e. OM1. In other words, the switch controller SC1 is capable of inserting in the routing table RT1 a new field including the association between the packets pk12 and the output module OM1. Therefore, according to the association included in the new field, upon reception of packets pk12 the switch controller SC1 configures the packet-switching matrix PS1 so that the packets pk12 are transmitted through the output module OM1 to the upstream side transceiver TRu1, which then forwards them to the intermediate node N3. Preferably, the probability to transmit each packet pk12 through the output module OM1 depends on the value of the information indicative of the packet priority.

Then, the intermediate node N3 receives the packets pk11 and pk12 through the first downstream side transceiver TRd31, which forwards them to the switch S3.

Figure 5B:
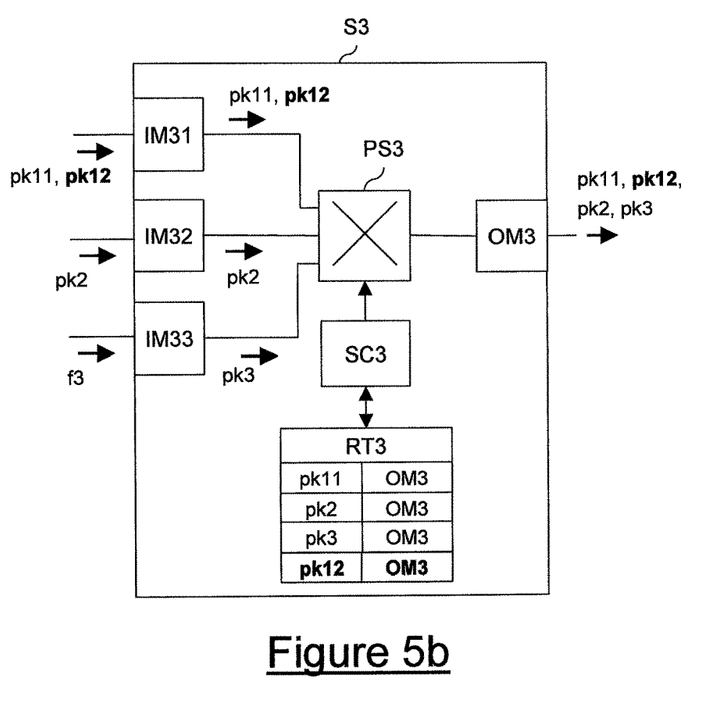

Accordingly, the switch S3 receives the packets pk11 and pk12, the packets pk2, and an upstream flow f3 through the input modules IM31, IM32, and IM33, respectively.

Preferably, the input module IM31 forwards the packets pk11 and pk12 to the packet-switching matrix PS3. Further, preferably, the input module IM32 forwards the packets pk2 to the packet-switching matrix PS3. Besides, preferably, the input module IM33 splits the upstream traffic flow f3 in packets pk3, as described above.

According to embodiments of the present invention, the switch S3 multiplexes the packets pk11, pk12, pk2 and pk3, and it transmits the multiplexed packets in the upstream direction (i.e. to the intermediate node N4, in the exemplary network RAN of FIG. 1).

In particular, the processing of the packets pk11, pk2 and pk3 is similar to the above described processing. Accordingly, a detailed description will not be repeated.

On the other hand, since the packets pk12 have the same destination of the packets pk11 (i.e. the traffic collection center TCC), the information indicative of packet destination included in the packets pk12 is identical to the information indicative of packet destination included in the packets pk11. Therefore, advantageously, the switch controller SC3 is capable of determining autonomously that the packets pk12 have to be output from the packet-switching matrix PS3 through the same output module through which the packets pk11 are output, i.e. OM3. In other words, the switch controller SC3 is capable of inserting in the routing table RT3 a new field including the association between the packets pk12 and the output module OM3. Therefore, according to the association included in the new field, upon reception of packets pk12 the switch controller SC3 configures the packet-switching matrix PS3 so that the packets pk12 are transmitted through the output module OM3 to the upstream side transceiver TRu3, which then forwards them in the upstream direction. Preferably, the probability to transmit each packet pk12 through the output module OM3 depends on the value of the information indicative of the packet priority.

Therefore, advantageously, the activation of the new access device A12 does not require complex and time consuming operations for upgrading nodes supporting transmission of the new upstream traffic flow f12 generated by the new access device A12. Indeed, the only operation that has to be performed is providing a new input module IM12 for connecting the new access device A12 to the switch S1 and for splitting the new upstream traffic flow f12 in packets pk12. After such an input module IM12 has been provided, the nodes involved in transmission of the new upstream traffic flow f12 (i.e. the nodes N1, N3 and N4 in the exemplary radio access network RAN of FIG. 1) are capable of determining autonomously how such a new upstream traffic flow f12 has to be routed, according to the information already comprised in their routing tables (in particular, the field comprising the association between the packets pk11 and the output modules OM1 and OM3, respectively) and according to the information indicative of the packet destination which is comprised in the packets pk12.

Advantageously, switches S1 and S3 do not have to be manually reconfigured, i.e. neither a new connection has to be manually provided, nor a new field has to be manually inserted in the routing tables RT1 and RT3. Accordingly, the operation of upgrading the radio access network for supporting transmission of the new upstream traffic flow f12 is very simple, automatic and quick.

Further, advantageously, the upstream bandwidth is exploited in a very efficient way, while preserving quality of service of each upstream flow. Indeed, splitting each upstream flow in packets, discarding empty packets, including in each packet an information indicative of the packet priority and multiplexing each packet according to such an information advantageously allows to dynamically vary the upstream bandwidth allocated to the TDM flow according both to the quality of service that must be guaranteed to the traffic transported by the traffic flow and according to the actual amount of traffic transported by a traffic flow.

In the above example, it has been assumed that a new access device is activated within an existing node. Nevertheless, the same considerations apply also in case the radio access network is expanded by adding a new node. Indeed, in this case it is simply required to equip the node immediately upstream the new node with a new downstream side transceiver configured to exchange traffic with the new node (independently of the number of access devices included in the new node) and to equip the switch of such an immediately upstream node with a new input module, which is then connected to the new downstream side transceiver.

When the new node is activated, the upstream traffic flow(s) transmitted by the new node is received and processed by the immediately upstream node similarly to what described above. Therefore, advantageously, also in this case the operation of upgrading the radio access network for supporting transmission of the new upstream traffic flow f12 is very simple, automatic and quick.

The invention claimed is:

1. A method for routing an upstream traffic flow generated at a node of a radio access network, said upstream traffic flow transporting traffic transmitted by radio terminals located within a coverage area of a first access device of said node, said method comprising:
   (a) at said node, splitting said upstream traffic flow in packets associated with said first access device;
   (b) at said node, inserting in at least one of said packets an information indicative of a destination of said upstream traffic flow, said destination being a traffic collection center of said radio access network; and
   (c) routing the at least one of said packets to an output of a packet-switching matrix of said node towards said traffic collection center, the output determined based on a previously determined output associated with another packet, the other packet having the same destination as the at least one of said packets and being associated with a second access device different from said first access device.

2. The method according to claim 1, wherein said step c) comprises a step of automatically generating, according to said information indicative of said destination, an association between said packets and the output of the packet-switching matrix of said node.

3. The method according to claim 1, further comprising a step of inserting in said at least one of said packets an information indicative of a packet priority.

4. The method according to claim 3, further comprising deciding whether to transmit or discard said at least one of said packets according to said information indicative of said packet priority.

5. The method according to claim 1, wherein said step c) further comprises, in case one of said packets comprises a portion of said upstream traffic flow which does not transport traffic, discarding said one of said packets.

6. A node of a radio access network, wherein said node comprises a first access device and an input module, said input module configured to:
   receive an upstream traffic flow from said first access device, said upstream traffic flow transporting traffic transmitted by radio terminals located within a coverage area of said first access device;
   split said upstream traffic flow in packets associated with said first access device; and
   insert in at least one of said packets an information indicative of a destination of said upstream traffic flow, said destination being a traffic collection center of said radio access network,
   and wherein said node further comprises a packet-switching matrix configured to route the at least one of said packets to an output of the packet-switching matrix towards said traffic collection center, the output determined based on a previously determined output associated with another packet, the other packet having the same destination as the at least one of said packets and being associated with a second access device different from said first access device.

7. The node according to claim 6, wherein said node further comprises a switch controller configured to automatically generate, according to said information indicative of said destination, an association between said packets and the output of the packet-switching matrix of said node, and a routing table for storing said association.

8. The node according to claim 6, wherein said input module is further configured to insert in the at least one of said packets an information indicative of a packet priority, and wherein said packet-switching matrix is further configured to decide whether to transmit or discard the at least one of said packets according to said information indicative of said packet priority.

9. The node according to claim 6, wherein said input module is further configured to, in case one of said packets comprises a portion of said upstream traffic flow which does not transport traffic, discard said one of said packets.

10. A radio access network comprising the node according to claim 6.

* * * * *